US010019455B2

(12) United States Patent
Tan

(10) Patent No.: US 10,019,455 B2
(45) Date of Patent: Jul. 10, 2018

(54) SELECTING SEARCH QUERIES FOR DISPLAY WITH DATA ASSOCIATED WITH SEARCH TERMS

(75) Inventor: Qifeng Tan, Shanghai (CN)

(73) Assignee: Google LLC, Mountain View, CA (US)

( * ) Notice: Subject to any disclaimer, the term of this patent is extended or adjusted under 35 U.S.C. 154(b) by 350 days.

(21) Appl. No.: 14/397,464

(22) PCT Filed: Apr. 27, 2012

(86) PCT No.: PCT/CN2012/074844
§ 371 (c)(1),
(2), (4) Date: Apr. 6, 2015

(87) PCT Pub. No.: WO2013/159345
PCT Pub. Date: Oct. 31, 2013

(65) Prior Publication Data
US 2015/0227539 A1 Aug. 13, 2015

(51) Int. Cl.
G06F 7/00 (2006.01)
G06F 17/30 (2006.01)
G06Q 30/02 (2012.01)

(52) U.S. Cl.
CPC .. *G06F 17/30126* (2013.01); *G06F 17/30241* (2013.01); *G06F 17/30864* (2013.01); *G06Q 30/0247* (2013.01)

(58) Field of Classification Search
CPC ......... G06F 17/30864; G06F 17/30126; G06F 17/30241; G06C 30/0247
See application file for complete search history.

(56) References Cited

U.S. PATENT DOCUMENTS

| 6,327,589 | B1* | 12/2001 | Blewett | G06F 17/30864 |
| 7,475,063 | B2* | 1/2009 | Datta | G06F 17/2795 |
| 7,617,200 | B2* | 11/2009 | Budzik | G06F 17/30389 |
| 7,630,972 | B2* | 12/2009 | Ott, IV | G06F 17/30864 |
| 7,856,433 | B2* | 12/2010 | Valz | G06F 17/30867 707/722 |
| 7,920,107 | B2* | 4/2011 | Imamura | G09G 3/3241 345/76 |
| 7,921,107 | B2* | 4/2011 | Chang | G06Q 30/02 707/706 |
| 2002/0032677 | A1* | 3/2002 | Morgenthaler | G06F 17/30781 |
| 2007/0174244 | A1* | 7/2007 | Jones | G06F 17/30648 |
| 2008/0021884 | A1* | 1/2008 | Jones | G06F 17/30864 |

(Continued)

FOREIGN PATENT DOCUMENTS

CN 101075395 11/2007

OTHER PUBLICATIONS

International Search Report and Written Opinion in International Application No. PCT/CN2012/074844, dated Feb. 7, 2013, 10 pages.

*Primary Examiner* — Daniel Kuddus
(74) *Attorney, Agent, or Firm* — Fish & Richardson P.C.

(57) ABSTRACT

A method performed by one or more processing devices, comprising: receiving a request for data associated with search terms; identifying, in a storage device, the data associated with the search terms; identifying search queries associated with the search terms; determining amounts of advertising revenue for at least a plurality of the search queries; and selecting, from the plurality of the search queries and based on the amounts of advertising revenue, one or more search queries for display with the data associated with the search terms.

15 Claims, 4 Drawing Sheets

(56) References Cited

U.S. PATENT DOCUMENTS

| | | | |
|---|---|---|---|
| 2008/0256039 A1* | 10/2008 | Chang .................... | G06Q 30/02 |
| 2008/0256060 A1* | 10/2008 | Chang .................... | G06Q 30/02 |
| 2008/0256061 A1* | 10/2008 | Chang .................... | G06Q 30/02 |
| 2008/0275863 A1* | 11/2008 | Dominowska ......... | G06Q 30/02 |
| 2009/0010310 A1* | 1/2009 | Rofougaran ........... | H03D 3/244 |
| | | | 375/135 |
| 2009/0070310 A1* | 3/2009 | Srivastava ............. | G06Q 30/02 |
| 2010/0318426 A1* | 12/2010 | Grant ............... | G06F 17/30864 |
| | | | 705/14.66 |
| 2011/0184814 A1* | 7/2011 | Konkol ................. | G06Q 30/02 |
| | | | 705/14.69 |

* cited by examiner

SELECTING SEARCH QUERIES FOR DISPLAY WITH DATA ASSOCIATED WITH SEARCH TERMS

BACKGROUND

This disclosure generally relates to selecting search queries for display with data associated with search terms.

Advertisers promote products and services through advertisements. Advertisements can be presented through numerous types of media, including, e.g., Internet, television, radio, newspapers and magazines.

SUMMARY

In one aspect of the present disclosure, a method performed by one or more processing devices includes receiving a request for data associated with search terms; identifying, in a storage device, the data associated with the search terms; identifying search queries associated with the search terms; determining amounts of advertising revenue for at least a plurality of the search queries; and selecting, from the plurality of the search queries and based on the amounts of advertising revenue, one or more search queries for display with the data associated with the search terms.

Implementations of the disclosure can include one or more of the following features. In some implementations, selecting the one or more search queries includes: selecting, from the plurality of the search queries, one or more search queries associated with increased amounts of advertising revenue relative to other amounts of advertising revenue for other of the plurality of the search queries. In other implementations, the method includes generating data for a graphical user interface that includes: a visual representation of the data associated with the search terms juxtaposed to a visual representation of the one or more search queries selected from the plurality of the search queries; and transmitting the data for the graphical user interface to a client device.

In still other implementations, determining includes: for at least one search query in the plurality of the search queries: obtaining one or more search results for the at least one search query; determining advertisements displayed with the one or more search results; determining amounts of advertising revenue attributable to the advertisements; and summing the amounts of advertising revenue attributable to the advertisements.

In still other implementations, the visual representation of the data associated with the search terms includes a map. In yet other implementations, the method includes searching, based on contents of the request, for the search queries associated with the search terms; wherein identifying the search queries associated with the search terms includes: identifying, based on searching, the search queries associated with the search terms.

In still another aspect of the disclosure, one or more machine-readable media are configured to store instructions that are executable by one or more processing devices to perform operations including receiving a request for data associated with search terms; identifying, in a storage device, the data associated with the search terms; identifying search queries associated with the search terms; determining amounts of advertising revenue for at least a plurality of the search queries; and selecting, from the plurality of the search queries and based on the amounts of advertising revenue, one or more search queries for display with the data associated with the search terms. Implementations of this aspect of the present disclosure can include one or more of the foregoing features.

In still another aspect of the disclosure, a system includes one or more processing devices operative to perform operations including: receiving a request for data associated with search terms; identifying, in a storage device, the data associated with the search terms; identifying search queries associated with the search terms; determining amounts of advertising revenue for at least a plurality of the search queries; and selecting, from the plurality of the search queries and based on the amounts of advertising revenue, one or more search queries for display with the data associated with the search terms. Implementations of this aspect of the present disclosure can include one or more of the foregoing features.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF DRAWINGS

Like reference symbols and designations in the various drawings indicate like elements.

DETAILED DESCRIPTION

A system consistent with this disclosure identifies search queries for display with data associated with search terms. In an example, the system identifies the search queries based on amounts of advertising revenue associated with the search queries. Generally, advertising revenue includes an amount of revenue that is attributable to an advertisement.

In response to a search query, the system provides a user with search results. The search results can include advertisements, e.g., for display next to the search results in a web page. In this example, an amount of advertising revenue can be attributable to advertisement. An amount of advertising revenue also can be attributable to the search query. In this example, advertising revenue for the search query is based on amounts of advertising revenue that are attributable to advertisements in search results of the search query.

An amount of advertising revenue for an advertisement can vary, e.g., based on numerous factors. In an example, the amount varies based on an effectiveness of the advertisement. In this example, the amount of advertising revenue increases as the effectiveness of the advertisement increases. An increase in the advertising revenue for the advertisement causes the advertising revenue for the search query to also increase. The system is configured to select search queries with increased amounts of advertising revenue, e.g., relative to amounts of advertising revenue for other search queries.

Figure 1:
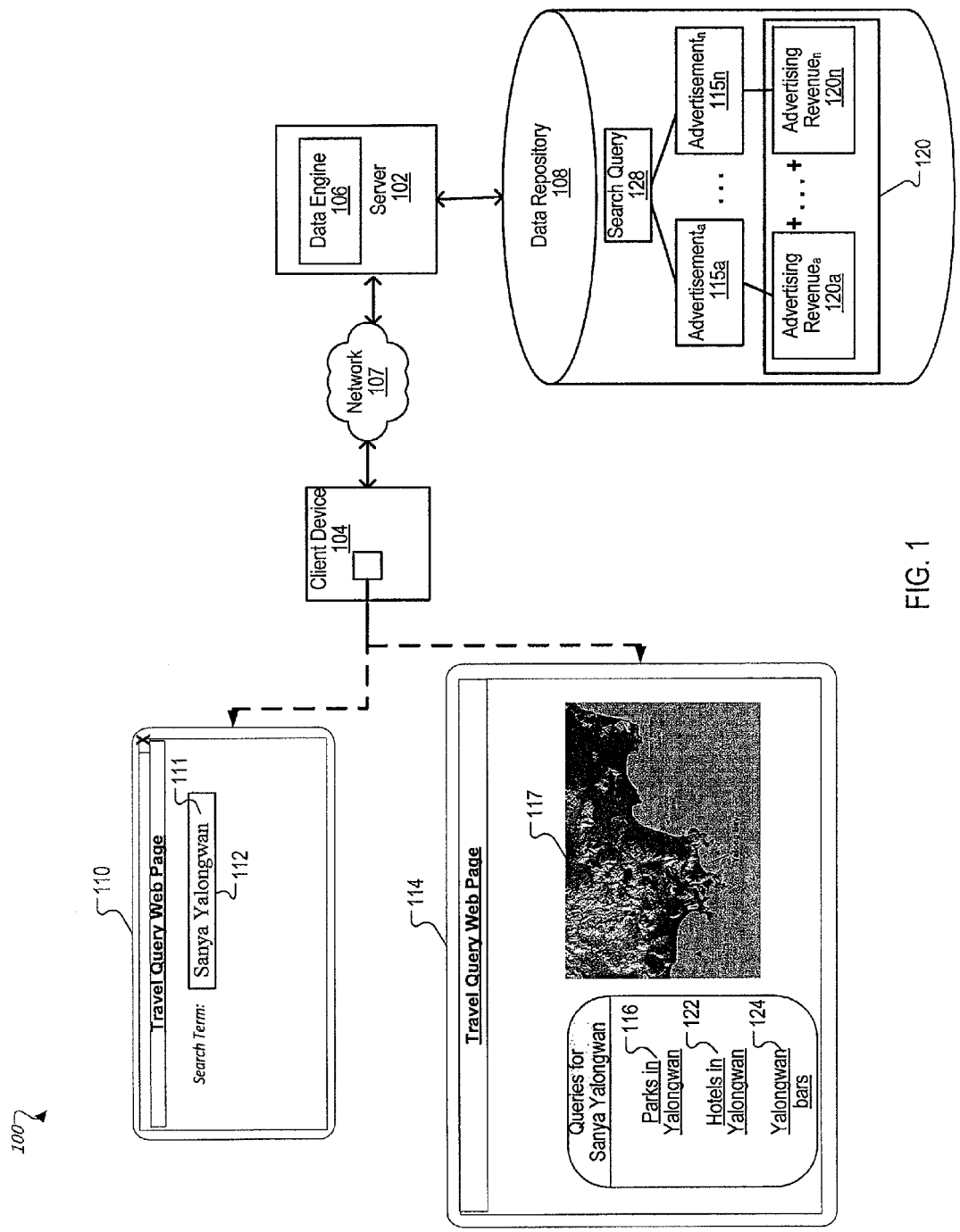
FIG. 1 is a conceptual diagram of an example of a system for identifying search queries for display with data associated with search terms.

FIG. 1 is a conceptual diagram of an example of system 100 for identifying search queries for display with data associated with search terms. System 100 includes server 102, data repository 108 and network 107. Data repository 108 is configured to host numerous resources, including, e.g., web pages, images, documents, files, and the like. In the example of FIG. 1, data repository 108 stores web pages 110, 114 and image 117.

Server 102 includes data engine 106 that is configured to crawl, index, and/or search resources, including, e.g., web pages 110, 114 and image 117. Data engine 106 can crawl, index and/or search contents of data repository 108 and/or contents of other devices configured for communication with server 102 through network 107.

In an example, data engine 106 includes a search engine and/or components of a search engine. Although data engine 106 is shown as a single component in FIG. 1, data engine 106 can exist in one or more components, which can be distributed and coupled by network 107.

System 100 also includes client device 104. Client device 104 can communicate with server 102 over network 107. In the example of FIG. 1, client device 104 uses network 107 to access web pages 110, 114. Web page 110 includes a graphical user interface for searching for data associated with search terms, including, e.g., search terms indicative of a geographic location (e.g., a travel destination, a city, a state, a region, a country, a hotel, a restaurant, a shopping mall, a park, and the like).

Web page 110 includes search box 112. A user (not shown) of client device 104 inputs search terms 111 into search box 112. In this example, search terms 111 include the terms of Sanya Yalongwan and are indicative of a geographic location in China. Sanya City is a city in Hainan Province, China. Yalongwan Bay is a bay in Sanya City, China.

Client device 104 generates a request (not shown) for a search that uses search terms 111. Client device 104 sends the request to server 102. Server 102 receives the request. In response, data engine 106 generates search query 128. Search query 128 includes instructions to search for data that is relevant to search terms 111. Using search query 128, data engine 106 searches for data associated with search terms 111.

In an example, data engine 106 searches an index (not shown) in data repository 108 for the data. The index includes data specifying contents of resources stored in data repository 108 and/or contents of resources hosted by other servers (not shown) that are configured for communication with server 102. In this example, data engine 106 updates the index with data collected by crawling contents of the resources stored in data repository 108 and/or the contents of the resources hosted by the other servers.

Data engine 106 searches the index for the data that is associated with search terms 111. In an example, the data that is associated with search terms 111 includes data that is relevant to search terms 111. Based on searching the index, data engine 106 identifies data that is associated with the geographic location specified by search terms 111. In the example of FIG. 1, the identified data includes image 117, including, e.g., a map of the Yalongwan Bay in Sanya City, China.

Data engine 106 also identifies search queries to display with image 117, e.g., in web page 114 and/or in another resource. Search queries include data specifying searches that have been performed by data engine 106. Data repository 108 stores data specifying the search queries performed by data engine 106, including, e.g., search query 128. In this example, search query 128 is generated when a user of a client device (e.g., client device 104 or another client device) submits one or more search terms to server 102. In this example, search query 128 includes the one or more submitted search terms.

In this example, the data specifying the search queries performed by data engine 106 is stored in the index in data repository 108. Data engine 106 searches the index for search queries associated with the geographic location specified by search terms 111. In an example, data engine 106 identifies search queries that include one or more of search terms 111, a derivative of one or more of search terms 111, one or more synonyms of search terms 111, and the like.

In another example, data engine 106 identifies search queries for topics that are related to one or more of search terms 111. In this example, search query 128 can include terms that differ from search terms 111. In an example, search terms 111 include a name of a baseball player. In this example, data engine 106 identifies search query 128 for a topic that is related to the baseball player, namely, a search query for the baseball team of which the searched baseball player is a member.

For the identified search queries, data engine 106 determines search results and advertisements displayed with the search results. For the advertisements, data engine 106 determines amounts of advertising revenue. Using the amounts of advertising revenue for the advertisements, data engine 106 determines amounts of advertising revenue for the identified search queries, e.g., as described in further detail below.

In an example, data repository 108 is configured to store search queries and associated search results for a predefined period of time, including, e.g., a number of hours, a number of days, a number of months, and the like. In this example, data repository 108 is also configured to store the advertisements included in the search results for the predefined period of time. In another example, data repository 108 is configured to store search queries and associated search results (and the associated advertisements) for an indefinite period of time.

In the example of FIG. 1, data engine 106 identifies search query 128 as associated with search terms 111. Search query 128 includes the search terms of Parks in Yalongwan. In this example, search query 128 includes one of search terms 111, e.g., the search term of Yalongwan.

Search query 128 is associated with advertisements 115a . . . 115n and search results (not shown), e.g., following execution of search query 128. Advertisements 115a . . . 115n are associated with advertising revenues 120a . . . 120n, respectively. In this example, advertising revenues 120a . . . 120n include data specifying an amount of revenue attributable to advertisements 115a . . . 115n, respectively. Advertising revenues 120a . . . 120n can include various metrics that measure amounts of advertising revenue. In an example, advertising revenues 120a . . . 120n include Revenue per Minute (RPM) metrics. Generally, a RPM metric includes a measure of revenue generated per minute time internal that is attributable to an advertisement.

Using advertising revenues 120a ... 120n, data engine 106 determines an amount of advertising revenue 120 attributable to search query 128. Advertising revenue 120 includes data specifying a value of a summation of advertising revenues 120a ... 120n, including, e.g., a summation of RPM metrics for advertisements 115a ... 115n. For example, advertising revenue 120 can include a value indicative of advertising revenues 120a+ ... +120n.

In another example, advertisements 115a-115n include three advertisements, e.g., advertisements 115a, 115b (not shown), 115c (not shown). In this example, advertisements 115a, 115b, 115c are associated with advertising revenues 120a, 120b, 120c, respectively. Advertising revenue 120 includes a summation of advertising revenues 120a, 120b, 120c, including, e.g., advertising revenue 120a+advertising revenue 120b+advertising revenue 120c.

In an example, data engine 106 attributes advertising revenues 120a-120n to advertisements 115a-115n based on tracking conversions that are attributable to advertisements 115a-115n. In this example, as a user of client device 104 views advertisements 115a ... 115n, the user can make a conversion. Generally, a conversion includes a completion of a transaction associated with an advertisement. In an example, a conversion occurs when the user views advertisement 115a, clicks on advertisement 115a, accesses a landing page (not shown) for advertisement 115a, and/or completes a purchase through the landing page.

When the user views advertisement 115a and completes the conversion, a client device (e.g., client device 104) that displayed advertisement 115a and the landing page sends cookie data to data engine 106. Generally, cookie data includes data that is stored in a cookie on a client device and other data pertaining to information accessed from the client device. The cookie data specifies a unique identifier of the client device. The cookie data also indicates that the client device displayed advertisement 115a and the landing page and that the user completed the conversion.

Using the cookie data, data engine 106 determines that the user completed the conversion following viewing of advertisement 115a and the landing page. In this example, data engine 106 attributes an amount of revenue for a conversion (e.g., a purchase) to advertisement 115a. The cookie data can include information indicative of an amount of revenue associated with the conversion, including, e.g., an amount of money for which a product was purchased.

In another example, the cookie data can be used in identifying an amount of revenue that is associated with the conversion following viewing of advertisement 115a and the landing page. In this example, when the user initiates a conversion using a client device (e.g., client device 104), client device 104 sends to server 102 a request to complete the conversion (e.g., to make a purchase). The conversion is associated with a conversion identifier. In this example, details of the conversion are stored in data repository 108 in association with the conversion identifier. Details of the conversion can include information specifying an amount of revenue associated with the conversion, a date on which the conversion was completed, and the like.

In this example, the cookie data also includes the conversion identifier. For example, when the user initiates the conversion through a web page, the web page can execute a script that generates a conversion identifier and populates the cookie data with the conversion identifier.

Upon receipt of the cookie data that includes the conversion identifier, date engine 106 searches data repository 108 for a conversion identifier that matches the conversion identifier in the cookie data. Based on a match between conversion identifiers, data engine 106 determines an amount of revenue for a particular conversion specified by the cookie data. As previously described, the cookie data specifies that the user completed the conversion following viewing of advertisement 115a and the landing page. In this example, data engine 106 attributes the amount of revenue (associated with the conversion identifier in the data repository 108) to advertisement 115a (which is also associated with the same conversion identifier via the cookie data).

In the example of FIG. 1, the amount of revenue for the conversion is included in advertising revenue 120a for advertisement 115a. Data engine 106 determines an amount of advertising revenue 120 for search query 128 by summing amounts of advertising revenues 120a ... 120n.

In the example of FIG. 1, data engine 106 compares the amount of advertising revenue 120 for search query 128 to other amounts of advertising revenue (not shown) for other search queries (not shown). Based on results of the comparison, data engine 106 determines one or more search queries with increased amounts of advertising revenue, e.g., relative to the other amounts of advertising revenue for the other search queries. Data engine 106 selects the one or more search queries of the determined type for display with image 117, e.g., in web page 114.

In an example, data engine 106 selects a predefined number of search queries with increased amounts of advertising revenue, e.g., relative to the other amounts of advertising revenue for the other search queries. In another example, data engine 106 selects search queries with amounts of advertising revenue exceeding a threshold value.

In the example of FIG. 1, data engine 106 selects search queries with an increased amount of advertising revenue, e.g., relative to other amounts of advertising revenue for other search queries. In an example, data engine 106 also ranks the selected search queries in accordance with relevance of the search queries to search terms 111. In this example, the search queries are associated with search terms 111. Data engine 106 generates data for visual representations 116, 122, 124 for the selected search queries.

Visual representation 116 includes a depiction of the search terms used in search query 128, e.g., the search terms of Parks in Yalongwan. Visual representation 122 includes a depiction of the search terms of Hotels in Yalongwan that are included in another search query (not shown) performed by data engine 106. Visual representation 124 includes a depiction of the search terms of Yalongwan Bars that are included in another search query (not shown) performed by data engine 106.

In this example, search query 128 and the search queries represented by visual representations 122,124 are associated with amounts of advertising revenue that exceed other amounts of advertising revenue for other search queries associated with Yalongwan. The other search queries can include search queries for libraries, beaches, sightseeing spots, and hospitals in Yalongwan, China.

Data engine 106 generates web page 114 for display of visual representations 116, 122, 124 and image 117. In the example of FIG. 1, web page 114 includes a graphical user interface in which visual representations 116, 122, 124 are juxtaposed to image 117. Generally, a juxtaposition includes a position of one item of data in proximity to another item of data.

In an example, visual representations 116, 122, 124 include selectable portions, including, e.g., links, buttons, navigational elements, and the like. When the user of client device 104 selects a selectable portion of visual representations 116, 122, 124, client device 104 sends a request (not shown) to server 102 for data engine 106 to execute a search query associated with the selected portion.

In an example, data engine 106 can label image 117 with data specifying geographic locations identified by search query 128. In this example, data engine 106 executes search query 128 to identify parks in Yalongwan, China. Data engine 106 generates data specifying geographic locations of the parks. Data engine 106 overlays the data on image 117 to label image 117 with the geographic locations of the parks. In this example, data specifying a geographic location of a park is linked to resources about the park, including, e.g., websites about the park, pictures of the park, and the like.

In another example, image 117 includes various types of maps, including, e.g., a schematic map, a satellite map, and the like. In this example, web page 110 can include a control (not shown) through which the user of client device 104 selects an image type for image 117.

Figure 2:
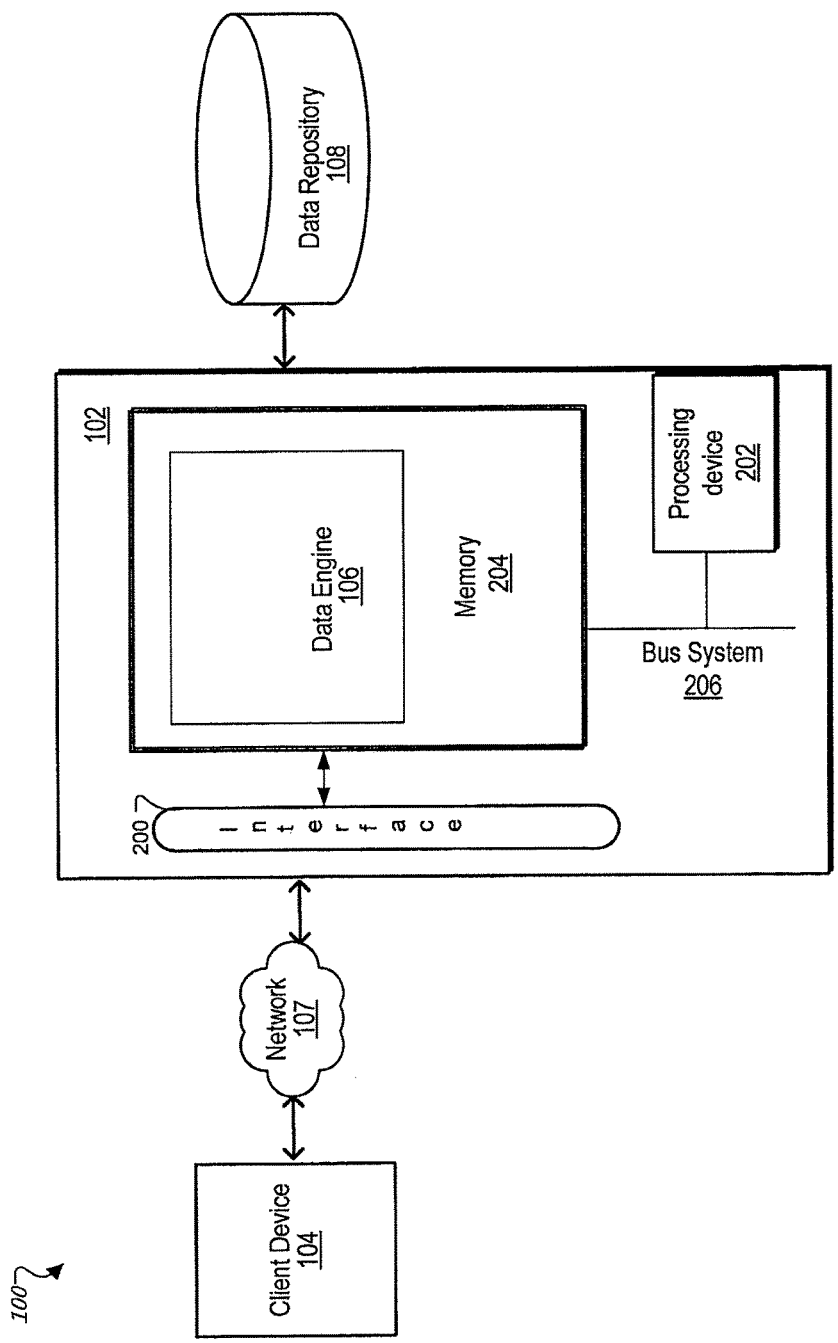
FIG. 2 is a block diagram showing examples of components of a system for identifying search queries for display with data associated with search terms.

FIG. 2 is a block diagram showing examples of components of system 100 for identifying search queries for display with data associated with search terms 111. In the example of FIG. 2, graphical user interfaces 110, 114, contents of graphical user interfaces 110, 114, and contents of data repository 108 are not shown.

Client device 104 can be a computing device capable of taking input from a user and communicating over network 107 with server 102 and/or with other client devices. For example, client devices 104 can be a mobile device, a desktop computer, a laptop, a cell phone, a personal digital assistant (PDA), a server, an embedded computing system, a mobile device, and the like. System 100 can include a plurality of client devices, which can be geographically dispersed.

Network 107 can include a large computer network, including, e.g., a local area network (LAN), wide area network (WAN), the Internet, a cellular network, or a combination thereof connecting a number of mobile computing devices, fixed computing devices, and server systems. The network(s) can provide for communications under various modes or protocols, including, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, including, e.g., using a Bluetooth, WiFi, or other such transceiver.

Server 102 can be a variety of computing devices capable of receiving data and running one or more services, which can be accessed by client device 104. In an example, server 102 can include a server, a distributed computing system, a desktop computer, a laptop, a cell phone, a rack-mounted server, and the like. Server 102 can be a single server or a group of servers that are at a same location or at different locations. Client device 104 and server 102 can run programs having a client-server relationship to each other. Although distinct modules are shown in the figures, in some examples, client and server programs can run on the same device.

Server 102 can receive data from client device 104 through input/output (I/O) interface 200. I/O interface 200 can be a type of interface capable of receiving data over a network, including, e.g., an Ethernet interface, a wireless networking interface, a fiber-optic networking interface, a modem, and the like. Server 102 also includes a processing device 202 and memory 204. A bus system 206, including, for example, a data bus and a motherboard, can be used to establish and to control data communication between the components of server 102.

Processing device 202 can include one or more microprocessors. Generally, processing device 202 can include an appropriate processor and/or logic that is capable of receiving and storing data, and of communicating over a network (not shown). Memory 204 can include a hard drive and a random access memory storage device, including, e.g., a dynamic random access memory, or other types of non-transitory machine-readable storage devices. As shown in FIG. 2, memory 204 stores computer programs that are executable by processing device 202. These computer programs include data engine 106.

Data engine 106 can be implemented in software running on a computer device (e.g., server 102), hardware or a combination of software and hardware. Although data engine 106 is shown as a single component in FIGS. 1 and 2, data engine 106 can exist in one or more components, which can be distributed and coupled by one or more networks (not shown).

In a variation of FIGS. 1 and 2, server 102 includes a search engine (not shown). In this example, data engine 106 is a component of the search engine. The search engine can be configured to perform one of more operations, including, e.g., crawling, indexing, and searching resources stored in data repository 108 and/or hosted by other servers (not shown) in communication with server 102 through network 107.

Figure 3:
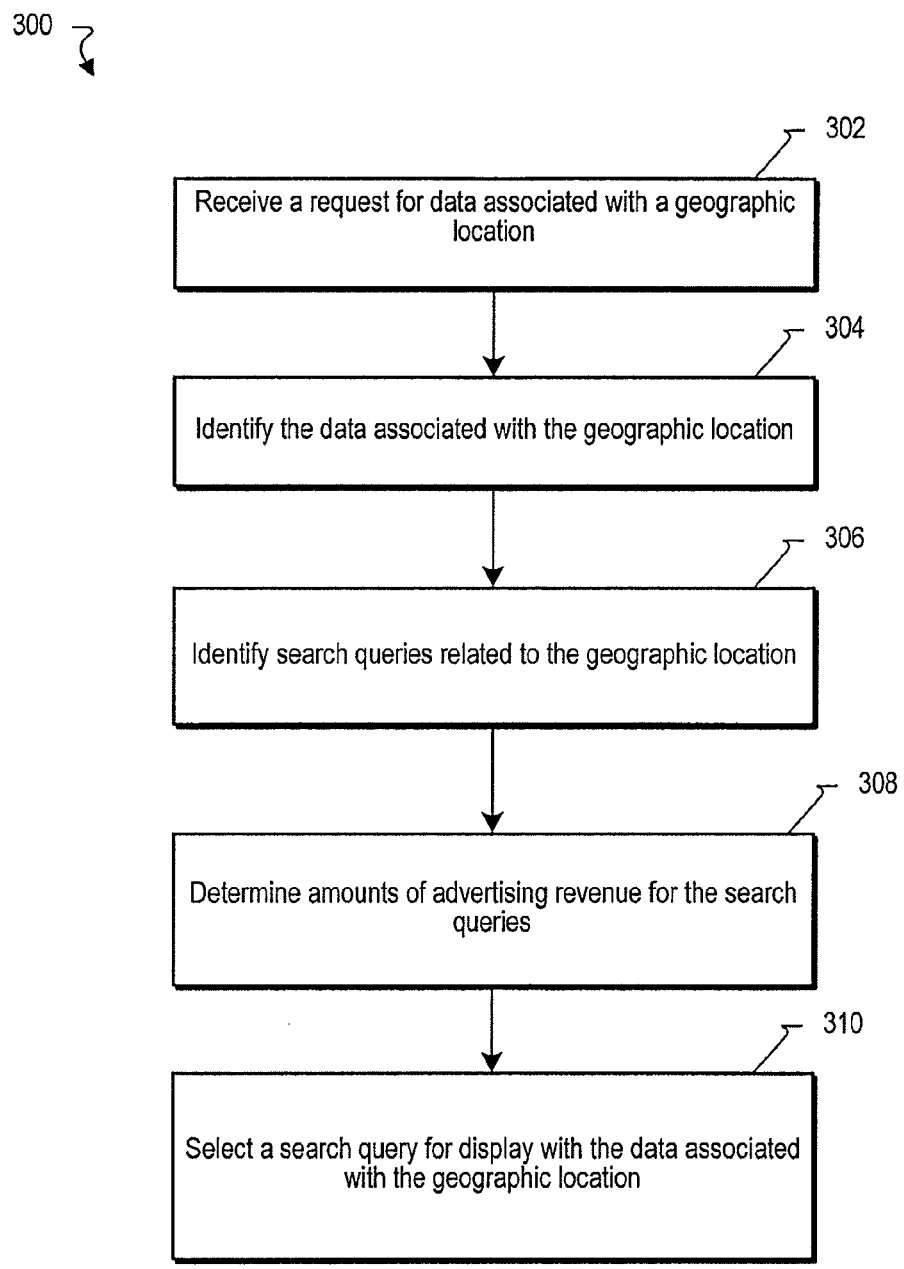
FIG. 3 is a flow chart of an example of a process for identifying search queries for display with data associated with search terms.

FIG. 3 is a flow chart of an example of process 300 for identifying search queries for display with data associated with search terms 111. In operation, data engine 106 receives (302) a request for data associated with search terms 111 (FIG. 1). Referring back to FIG. 1, the request is data associated with a geographic location specified by search terms 111. In response, data engine 106 searches (not shown) the index (not shown) in data repository 108 and identifies (304) data associated with search terms 111, including, e.g., image 117.

Data engine 106 also identifies (306) search queries associated with search terms 111, including, e.g., search query 128 and the search queries depicted by visual representations 122, 124. For a search query (e.g., search query 128), data engine 106 identifies advertisements (e.g., advertisement 115a-115n) that are associated with the search query (e.g., that are displayed next to the search query). For the identified advertisements 115a-115n, data engine 106 also identifies advertising revenues 120a-120n.

Data engine 106 sums advertising revenues 120a-120n to determine a total advertising revenue (e.g., advertising revenue 120) for search query 128. That is, data engine 106 determines (308) a value for advertising revenue 120, including, e.g., an amount of advertising revenue for search query 128. For example, as described above, data engine 106 can determine advertising revenue 120 by generating a summation of 120a+ . . . +120n.

Data engine 106 selects (310) search queries for display with the data associated with search terms 111. In an example, data engine 106 compares (not shown) the amounts of advertising revenue for the search queries. In this example, data engine 106 selects search queries with increased amounts of advertising revenue, e.g., relative to other amounts of advertising revenue for other search queries. In another example, data engine 106 selects search queries with amounts of advertising revenue that exceed a threshold value.

In an example, data engine 106 selects (not shown) search query 128 for display with image 117 in web page 114. Data engine 106 generates visual representation 116 to display contents of search query 128, including, e.g., the search terms of parks in Yalongwan.

Using the techniques described herein, a system in configured to select search queries for display with data associated with search terms. In an example, the system selects the search queries based on amounts of advertising revenue associated with the search queries. In this example, the system selects search queries that have increased amounts of advertising revenue, e.g., relative to other amounts of advertising revenue for other search queries.

Figure 4:
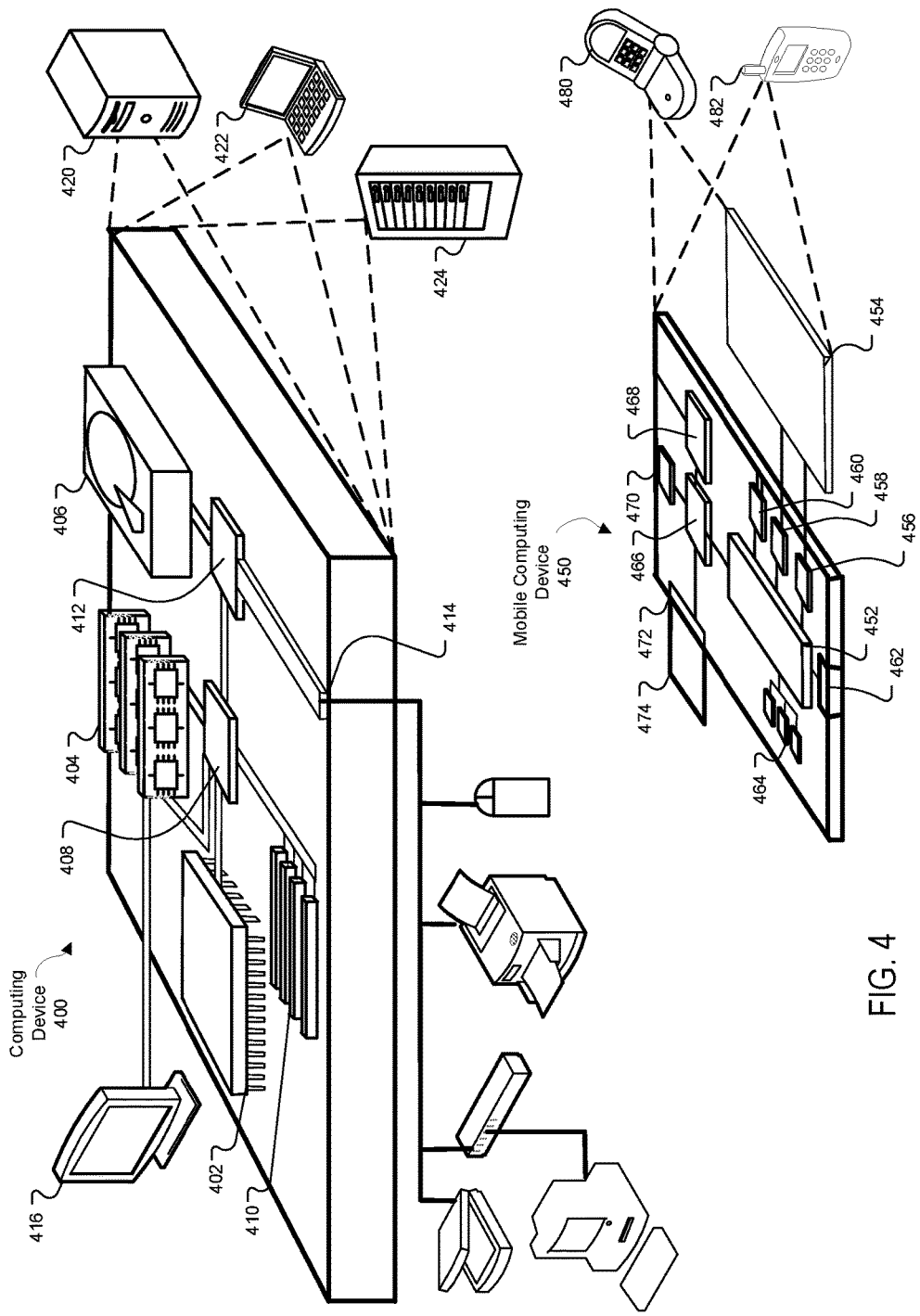
FIG. 4 shows an example of a computer device and a mobile computer device that can be used to implement the techniques described herein.

FIG. 4 shows an example of computer device 400 and mobile computer device 450, which can be used with the techniques described here. Computing device 400 is intended to represent various forms of digital computers, including, e.g., laptops, desktops, workstations, personal digital assistants, servers, blade servers, mainframes, and other appropriate computers. Computing device 450 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes processor 402, memory 404, storage device 406, high-speed interface 408 connecting to memory 404 and high-speed expansion ports 410, and low speed interface 412 connecting to low speed bus 414 and storage device 406. Each of components 402, 404, 406, 408, 410, and 412, are interconnected using various busses, and can be mounted on a common motherboard or in other manners as appropriate. Processor 402 can process instructions for execution within computing device 400, including instructions stored in memory 404 or on storage device 406 to display graphical data for a GUI on an external input/output device, including, e.g., display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations (e.g., as a server bank, a group of blade servers, or a multiprocessor system).

Memory 404 stores data within computing device 400. In one implementation, memory 404 is a volatile memory unit or units. In another implementation, memory 404 is a non-volatile memory unit or units. Memory 404 also can be another form of computer-readable medium, including, e.g., a magnetic or optical disk.

Storage device 406 is capable of providing mass storage for computing device 400. In one implementation, storage device 406 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable storage medium, including, e.g., memory 404, storage device 406, memory on processor 402, and the like. The computer readable storage medium does not include transitory signals.

High-speed controller 408 manages bandwidth-intensive operations for computing device 400, while low speed controller 412 manages lower bandwidth-intensive operations. Such allocation of functions is an example only. In one implementation, high-speed controller 408 is coupled to memory 404, display 416 (e.g., through a graphics processor or accelerator), and to high-speed expansion ports 410, which can accept various expansion cards (not shown). In the implementation, low-speed controller 412 is coupled to storage device 406 and low-speed expansion port 414. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 400 can be implemented in a number of different forms, as shown in the figure. For example, it can be implemented as standard server 420, or multiple times in a group of such servers. It also can be implemented as part of rack server system 424. In addition or as an alternative, it can be implemented in a personal computer including, e.g., laptop computer 422. In some examples, components from computing device 400 can be combined with other components in a mobile device (not shown), including, e.g., device 450. Each of such devices can contain one or more of computing device 400, 450, and an entire system can be made up of multiple computing devices 400, 450 communicating with each other.

Computing device 450 includes processor 452, memory 464, an input/output device including, e.g., display 454, communication interface 466, and transceiver 468, among other components. Device 450 also can be provided with a storage device, including, e.g., a microdrive or other device, to provide additional storage. Each of components 450, 452, 464, 454, 466, and 468, are interconnected using various buses, and several of the components can be mounted on a common motherboard or in other manners as appropriate.

Processor 452 can execute instructions within computing device 450, including instructions stored in memory 464. The processor can be implemented as a chipset of chips that include separate and multiple analog and digital processors. The processor can provide, for example, for coordination of the other components of device 450, including, e.g., control of user interfaces, applications run by device 450, and wireless communication by device 450.

Processor 452 can communicate with a user through control interface 458 and display interface 456 coupled to display 454. Display 454 can be, for example, a TFT LCD (Thin-Film-Transistor Liquid Crystal Display) or an OLED (Organic Light Emitting Diode) display, or other appropriate display technology. Display interface 456 can comprise appropriate circuitry for driving display 454 to present graphical and other data to a user. Control interface 458 can receive commands from a user and convert them for submission to processor 452. In addition, external interface 462 can communicate with processor 442, so as to enable near area communication of device 450 with other devices. External interface 462 can provide, for example, for wired communication in some implementations, or for wireless communication in other implementations, and multiple interfaces also can be used.

Memory 464 stores data within computing device 450. Memory 464 can be implemented as one or more of a computer-readable medium or media, a volatile memory unit or units, or a non-volatile memory unit or units. Expansion memory 474 also can be provided and connected to device 450 through expansion interface 472, which can include, for example, a SIMM (Single In Line Memory Module) card interface. Such expansion memory 474 can provide extra storage space for device 450, or also can store applications or other data for device 450. Specifically, expansion memory 474 can include instructions to carry out or supplement the processes described above, and can include secure data also. Thus, for example, expansion memory 474 can be provide as a security module for device 450, and can be programmed with instructions that permit secure use of device 450. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in an data carrier. The computer program product contains instructions that, when executed, perform one or more methods, including, e.g., those described above. The data carrier is a computer- or machine-readable medium, including, e.g., memory 464, expansion memory 474, and/or memory on processor 452, that can be received, for example, over transceiver 468 or external interface 462.

Device 450 can communicate wirelessly through communication interface 466, which can include digital signal processing circuitry where necessary. Communication interface 466 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, including, e.g., using a Bluetooth®, WiFi, or other such transceiver (not shown). In addition, GPS (Global Positioning System) receiver module 470 can provide additional navigation- and location-related wireless data to device 450, which can be used as appropriate by applications running on device 450.

Device 450 also can communicate audibly using audio codec 460, which can receive spoken data from a user and convert it to usable digital data. Audio codec 460 can likewise generate audible sound for a user, including, e.g., through a speaker, e.g., in a handset of device 450. Such sound can include sound from voice telephone calls, can include recorded sound (e.g., voice messages, music files, and the like) and also can include sound generated by applications operating on device 450.

Computing device 450 can be implemented in a number of different forms, as shown in the figure. For example, it can be implemented as cellular telephone 480. It also can be implemented as part of smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to a computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

For situations in which the systems and techniques discussed herein collect personal information about users, the users can be provided with an opportunity to opt in/out of programs or features that can collect personal information (e.g., information about a user's preferences or a user's current location). In addition, certain data can be anonymized in one or more ways before it is stored or used, so that personally identifiable information is removed. For example, a user's identity can be anonymized so that no personally identifiable information can be determined for the user, or a user's geographic location can be generalized where location information is obtained (e.g., to a city, zip code, or state level), so that a particular location of the user cannot be determined.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more processing devices, comprising:
receiving a request for data associated with search terms;
identifying, in a storage device, the data associated with the search terms;
identifying search queries descriptive of subject matter of the data associated with the search terms or comprising one or more of the search terms;
for each search query of at least a plurality of the search queries:
identifying one or more content items that have been sent, by one or more processing devices, to one or more computing systems in response to receiving the search query from the one or more computing systems;
for each of the one or more content items,
analyzing conversion data of that content item, the conversion data specifying completion of one or more transactions that are attributable to that content item and that occur during a period of time; and
determining, based on analyzing the conversion data, an amount of advertising revenue from the one or more transactions that is attributable to the content item during the period of time; and
aggregating amounts of advertising revenue attributable to the one or more content items to determine a total amount of advertising revenue attributable to the search query;
selecting, from the plurality of the search queries and based on determined total amounts of advertising revenue attributable to the plurality of search queries, one or more search queries for display with the data associated with the search terms;
generating data for a graphical user interface that comprises a visual representation of the data associated with the search terms juxtaposed to a visual representation of the one or more search queries selected from the plurality of the search queries, wherein the juxtaposition includes the visual representation of the data associated with the search terms being positioned in proximity to the visual representation of the one or more search queries; and
transmitting the data for the graphical user interface to a client device.

2. The method of claim 1, wherein selecting the one or more search queries comprises:
selecting, from the plurality of the search queries, one or more search queries associated with increased amounts of advertising revenue relative to other amounts of advertising revenue for other of the plurality of the search queries.

3. The method of claim 1, wherein determining comprises:
for at least one search query in the plurality of the search queries:
obtaining one or more search results for the at least one search query;
determining advertisements displayed with the one or more search results;
determining amounts of advertising revenue attributable to the advertisements; and
summing the amounts of advertising revenue attributable to the advertisements.

4. The method of claim 1, wherein the visual representation of the data associated with the search terms comprises a map.

5. The method of claim 1, further comprising:
searching, based on contents of the request, for the search queries associated with the search terms;
wherein identifying the search queries associated with the search terms comprises:
identifying, based on searching, the search queries associated with the search terms.

6. A system comprising:
one or more processing devices configured to perform operations comprising:
receiving a request for data associated with search terms;
identifying, in a storage device, the data associated with the search terms;
identifying search queries descriptive of subject matter of the data associated with the search terms or comprising one or more of the search terms;
for each search query of at least a plurality of the search queries:
identifying one or more content items that have been sent, by one or more processing devices, to one or more computing systems in response to receiving the search query from the one or more computing systems;
for each of the one or more content items,
analyzing conversion data of that content item, the conversion data, specifying completion of one or more transactions that are attributable to that content item and that occur during a period of time; and
determining, based on analyzing the conversion data, an amount of advertising revenue from the one or more transactions that is attributable to the content item during the period of time;
aggregating amounts of advertising revenue attributable to the one or more content items to determine a total amount of advertising revenue attributable to the search query;
selecting, from the plurality of the search queries and based on determined amounts of advertising revenue attributable to the plurality of search queries, one or more search queries for display with the data associated with the search terms;
generating data for a graphical user interface that comprises a visual representation of the data associated with the search terms juxtaposed to a visual representation of the one or more search queries selected from the plurality of the search queries, wherein the juxtaposition includes the visual representation of the data associated with the search terms being positioned in proximity to the visual representation of the one or more search queries; and
transmitting the data for the graphical user interface to a client device.

7. The system of claim 6, wherein selecting the one or more search queries comprises:
selecting, from the plurality of the search queries, one or more search queries associated with increased amounts of advertising revenue relative to other amounts of advertising revenue for other of the plurality of the search queries.

8. The system of claim 6, wherein determining comprises:
for at least one search query in the plurality of the search queries:
obtaining one or more search results for the at least one search query;
determining advertisements displayed with the one or more search results;
determining amounts of advertising revenue attributable to the advertisements; and
summing the amounts of advertising revenue attributable to the advertisements.

9. The system of claim 6, wherein the visual representation of the data associated with the search terms comprises a map.

10. The system of claim 6, wherein the operations further comprise:
searching, based on contents of the request, for the search queries associated with the search terms;
wherein identifying the search queries associated with the search terms comprises:
identifying, based on searching, the search queries associated with the search terms.

11. One or more non-transitory machine-readable media configured to store instructions that are executable by one or more processing devices to perform operations comprising:
receiving a request for data associated with search terms;
identifying, in a storage device, the data associated with the search terms;
identifying search queries descriptive of subject matter of the data associated with the search terms or comprising one or more of the search terms;
for each search query of at least a plurality of the search queries:
identifying one or more content items that have been sent, by one or more processing devices, to one or more computing systems in response to receiving the search query from the one or more computing systems;
for each of the one or more content items,
analyzing conversion data of that content item, the conversion data, specifying completion of one or more transactions that are attributable to that content item and that occur during a period of time;
determining, based on analyzing the conversion data, an amount of advertising revenue from the one or more transactions that is attributable to the content item during the period of time; and
aggregating amounts of advertising revenue attributable to the one or more content items to determine a total amount of advertising revenue attributable to the search query;
selecting, from the plurality of the search queries and based on determined amounts of advertising revenue attributable to the plurality of search queries, one or more search queries for display with the data associated with the search terms
generating data for a graphical user interface that comprises a visual representation of the data associated with the search terms juxtaposed to a visual representation of the one or more search queries selected from the plurality of the search queries, wherein the juxtaposition includes the visual representation of the data associated with the search terms being positioned in proximity to the visual representation of the one or more search queries; and
transmitting the data for the graphical user interface to a client device.

12. The one or more non-transitory machine-readable media of claim 11, wherein selecting the one or more search queries comprises:
selecting, from the plurality of the search queries, one or more search queries associated with increased amounts of advertising revenue relative to other amounts of advertising revenue for other of the plurality of the search queries.

13. The one or more non-transitory machine-readable media of claim 11, wherein determining comprises:
for at least one search query in the plurality of the search queries:
obtaining one or more search results for the at least one search query;
determining advertisements displayed with the one or more search results;
determining amounts of advertising revenue attributable to the advertisements; and
summing the amounts of advertising revenue attributable to the advertisements.

14. The one or more non-transitory machine-readable media of claim 11, wherein the visual representation of the data associated with the search terms comprises a map.

15. The one or more non-transitory machine-readable media of claim 11, wherein the operations further comprise:
searching, based on contents of the request, for the search queries associated with the search terms;
wherein identifying the search queries associated with the search terms comprises:
identifying, based on searching, the search queries associated with the search terms.

* * * * *

UNITED STATES PATENT AND TRADEMARK OFFICE
CERTIFICATE OF CORRECTION

| | | |
|---|---|---|
| PATENT NO. | : 10,019,455 B2 | Page 1 of 1 |
| APPLICATION NO. | : 14/397464 | |
| DATED | : July 10, 2018 | |
| INVENTOR(S) | : Tan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this
Sixth Day of December, 2022

Katherine Kelly Vidal
*Director of the United States Patent and Trademark Office*